US012679118B2

(12) United States Patent
Mistyurik et al.

(10) Patent No.: US 12,679,118 B2
(45) Date of Patent: Jul. 14, 2026

(54) MODULAR VARIABLE LENGTH CRUSH CUTTING APPARATUS AND METHOD

(71) Applicant: Avery Dennison Retail Information Services LLC, Mentor, OH (US)

(72) Inventors: John D. Mistyurik, Troy, OH (US); Lee R. Turck, Carlisle, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 209 days.

(21) Appl. No.: 18/560,192

(22) PCT Filed: Jun. 11, 2022

(86) PCT No.: PCT/IB2022/055426

§ 371 (c)(1),
(2) Date: Nov. 10, 2023

(87) PCT Pub. No.: WO2022/259226

PCT Pub. Date: Dec. 15, 2022

(65) Prior Publication Data

US 2024/0239118 A1 Jul. 18, 2024

Related U.S. Application Data

(60) Provisional application No. 63/209,272, filed on Jun. 10, 2021.

(51) Int. Cl.
*B41J 3/407* (2006.01)
*B41J 11/70* (2006.01)

(52) U.S. Cl.
CPC ........... *B41J 11/703* (2013.01); *B41J 3/4075* (2013.01)

(58) Field of Classification Search
CPC ........ B41J 11/703; B41J 15/04; B41J 3/4075; B41J 32/00; B41J 29/00; B41J 29/023;
(Continued)

(56) References Cited

U.S. PATENT DOCUMENTS

| | | | | |
|---|---|---|---|---|
| 2006/0191426 | A1 | 8/2006 | Timmerman et al. | |
| 2008/0095565 | A1 * | 4/2008 | Ray | B41J 3/4075 400/617 |
| 2020/0087015 | A1 | 3/2020 | Stern et al. | |

FOREIGN PATENT DOCUMENTS

| | | |
|---|---|---|
| EP | 0449461 | 10/1991 |
| EP | 0578372 | 1/1994 |
| WO | 2015/150851 | 10/2015 |

OTHER PUBLICATIONS

International Search Report and Written Opinion dated Sep. 20, 2022 issued in corresponding IA No. PCT/IB2022/055426 filed Jun. 11, 2022.

* cited by examiner

*Primary Examiner* — Kristal Feggins

(57) ABSTRACT

In some embodiments, a modular cutting system may include a crush-cutting unit configured to receive a label web from a printer and to cut through an adhesive layer of the label web towards an outer surface of the label web. In some embodiments, the system may include a support bracket configured for being mounted to a label printer. The system may include a tamp system. The tamp system may be configured for being mounted to the support bracket. The crush-cutting unit may be mounted to the support bracket. The system may include a printer configured for printing at least one of an image and text on the label web. The system may include an anvil positioned to hold the label web in place when the label web may be disposed between the anvil and the crush-cutting unit. The anvil may be positioned above the crush-cutting unit.

28 Claims, 17 Drawing Sheets

(58) Field of Classification Search
CPC ......... B41J 29/026; B41J 29/02; B26D 1/151; B26D 1/205; G03G 2215/00814; B65C 9/36; B65C 2210/007; B65C 11/0273
See application file for complete search history.

MODULAR VARIABLE LENGTH CRUSH CUTTING APPARATUS AND METHOD

CROSS-REFERENCE TO RELATED APPLICATIONS

The present application is a 371 of International Application No. PCT/182022/055426, which was published in English on Dec. 15, 2022, and claims priority to U.S. Provisional Application No. 63/209,272 filed Jun. 10, 2021, both of which are incorporated herein by reference in their entireties.

BACKGROUND

The present subject matter relates to label cutting and/or printing. More particularly, the present subject matter relates to variable length cutting devices and methods.

In some known label printing systems, printers are configured to print and dispense pre-cut labels, such as for application on packaging. Such systems may lack the ability to dispense and/or cut a continuous web of material, preventing users from adapting to different label lengths. These limitations may also result in increased costs of materials, material waste, and other possible inefficiencies. As a result, improvements may be made over such systems.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In some embodiments, a modular cutting system may include a crush-cutting unit configured to receive a label web from a printer and to cut through an adhesive layer of the label web towards an outer surface of the label web. The system may include a support bracket configured for being mounted to a label printer. The system may include a tamp system. The tamp system may be configured for being mounted to the support bracket. The crush-cutting unit may be mounted to the support bracket.

In some embodiments, the system may include a printer configured for printing at least one of an image and text on the label web. The system may include an anvil positioned to hold the label web in place when the label web may be disposed between the anvil and the crush-cutting unit. The anvil may be positioned above the crush-cutting unit. The crush-cutting unit may include a rotatable cutting wheel. The crush-cutting unit may include a blade that may be removable without external tools.

In some embodiments, the crush-cutting unit may be configured for receiving a label web after it has been separated from its liner. The crush-cutting unit may be configured for receiving a linerless label web. The crush-cutting unit may include a first wall and a second wall, each having a first section, a second section attached to the first section and extending laterally, and a third section attached to the first section and extending vertically. The crush-cutting unit may include a motor mounted to at least one of the second sections.

In some embodiments, a method may include using a crush-cutting unit, receiving a label web from a printer, the label web having an adhesive side and an opposite side, using a blade of the crush-cutting unit, crush-cutting through the label web from the adhesive side towards the opposite side. The crush-cutting unit may include a support bracket configured for being mounted to a label printer. The crush-cutting unit may include a tamp system.

In some embodiments, the tamp system may be configured for being mounted to the support bracket. The crush-cutting unit may be mounted to the support bracket. The printer may be configured for printing at least one of an image and text on the label web. The crush-cutting unit may include an anvil positioned to hold the label web in place when the label web may be disposed between the anvil and the crush-cutting unit. The anvil may be positioned above the crush-cutting unit.

In some embodiments, the crush-cutting unit may include a rotatable cutting wheel. The crush-cutting unit may include a blade that may be removable without external tools. The crush-cutting unit may be configured for receiving a label web after its liner has been separated from the label web. The crush-cutting unit may be configured for receiving a linerless label web. The crush-cutting unit may include a first wall and a second wall, each having a first section, a second section attached to the first section and extending laterally, and a third section attached to the first section and extending vertically. The crush-cutting unit may include a motor mounted to at least one of the second sections.

DESCRIPTION OF THE ILLUSTRATED EMBODIMENTS

As required, detailed embodiments of the present subject matter are disclosed herein; however, it is to be understood that the disclosed embodiments are merely exemplary of the present subject matter, which may be embodied in various forms. Therefore, specific details disclosed herein are not to be interpreted as limiting, but merely as a basis for the claims and as a representative basis for teaching one skilled in the art to variously employ the present subject matter in virtually any appropriate manner.

In at least some of the embodiments described in this document, modular systems and methods are disclosed for operation with a commercial printer applicator system. In other embodiments, non-modular printer applicator systems and methods are described.

In some embodiments, a modular cutting system may include components such as a housing, electronics, and/or signal interfacing. For example, the system may receive GPIO signals from a printer (e.g., a printer applicator). These may allow the system to control some of the operations of the printer and/or to allow the system to be controlled by the printer.

In some embodiments, the modular cutting system may include a rolling cutter (e.g., one or more cutting wheels) that may be configured to cut across one or more layers of material. The material may be part of a web, such as for a continuous label that may or may not include a liner. In some embodiments, the rolling cutter may cut material against a support such as an anvil. In various embodiments, the anvil may be hardened and/or may be softer than the rolling cutter. In various embodiments, the rolling cutter may operate as a crush cutter. In some embodiments, the cutter may cut through the web from the adhesive side of the material while a side of the web without an adhesive is abutted against and/or contacting the support.

Figure 1:
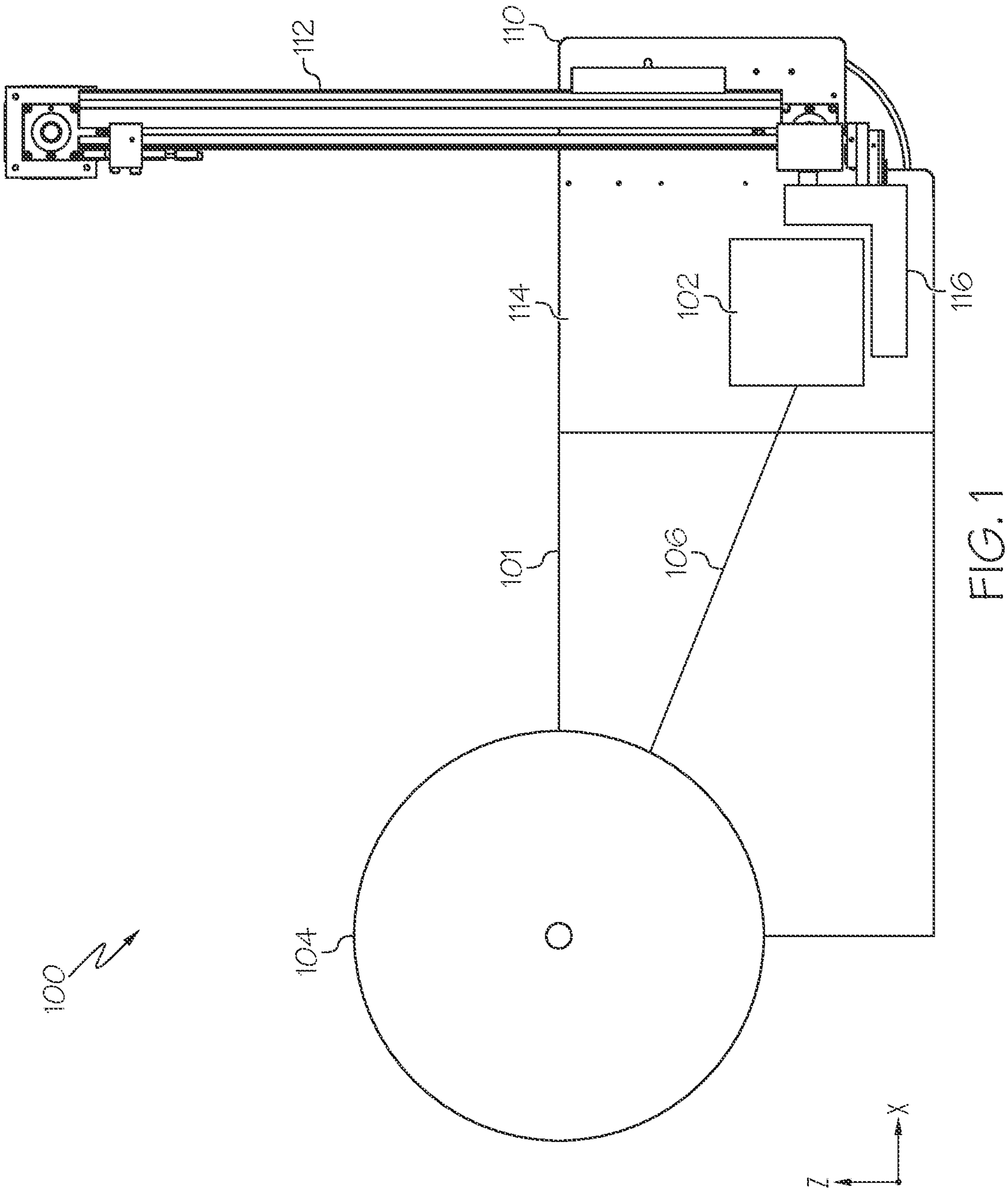
FIG. 1 includes a partial schematic diagram of a cutting system in accordance with some embodiments.

FIG. 1 includes a side view of a cutting system 100 in accordance with some embodiments. Various embodiments may include one or more of a printer system 101, a printer 102, a feeder spool 104, a label web 106, a liner web 107 (not shown), a return spool 108 (not shown), an application system 110, a tamp system 112, a support bracket 114, a cutting unit 116, and/or an air assist unit 118 (not shown). In some embodiments, the label web 106 may lack a liner web 107. In some embodiments, the printer system 101 may lack a return spool 108 and/or an air assist unit 118.

The printer system 101 may be mounted with and/or coupled to an application system 110, which may include one or more of the cutting unit 116, the tamp system 112, and the support bracket 114.

The printer system 101, illustrated as a block diagram in FIG. 1, may include a feeder spool 104 mounted with a label web 106 that may or may not be subdivided into separate labels and that may or may not include a liner web 107. As the label web 106 is drawn from the feeder spool 104, it may be printed on by a printer 102, such as with label information including one or more of text, graphics, symbols, 1D or 2D barcodes, or other imagery. In some embodiments, the label web includes RFID tags.

In some embodiments, after printing, the label web 106 is drawn into the cutting unit 116 for cutting. In various embodiments, the cutting may be performed by a rolling cutter (e.g., which may include one or more cutting wheels) that may be configured to cut across one or more layers of material. The material may be part of a web, such as for a continuous label that may or may not include a liner.

In some embodiments, the rolling cutter may cut material against a support such as an anvil. In various embodiments, the anvil may be hardened and/or may be softer than the rolling cutter. In various embodiments, the rolling cutter may operate as a crush cutter. In some embodiments, the cutter may cut through the web from the adhesive side of the material while a side of the web without an adhesive is abutted against and/or contacting the support. Additional details are provided below.

In some embodiments that include use of a label material with a liner web, before cutting, the label material is separated from a liner web 107. The liner web 107 may be pulled onto a return spool 108 (not shown).

In various embodiments with or without use of a liner web 107, after complete cutting, the cut label material may be picked up by the tamp system 112, which may then deliver the cut label material to a target object for labeling. In some embodiments, partial cutting may occur instead, such as by cutting to a restricted depth through label material but not through liner material, by adding perforations, or by cutting through some sections of label web 106 and/or liner web 107, but not others.

In some embodiments, an air assist unit 118 (not shown) is attached to the support bracket 114. The air assist unit 118 may be a tube extending along a Y-axis, which may be perpendicular to a plane defined by the X-axis and the Z-axis. The air assist unit 118 may include one or more holes formed in an outer surface to direct air towards the tamp system 112. The one or more holes may be formed to direct air at an angle upwards and/or laterally to cause a label to be biased towards part of the tamp system 112, such as toward the bottom of the tamp head 306. In some embodiments, the air assist unit may include a manifold or ductwork to enhance or facilitate redirection of air towards the label. Additional details regarding features and operations found in some embodiments are provided below.

Figure 2:
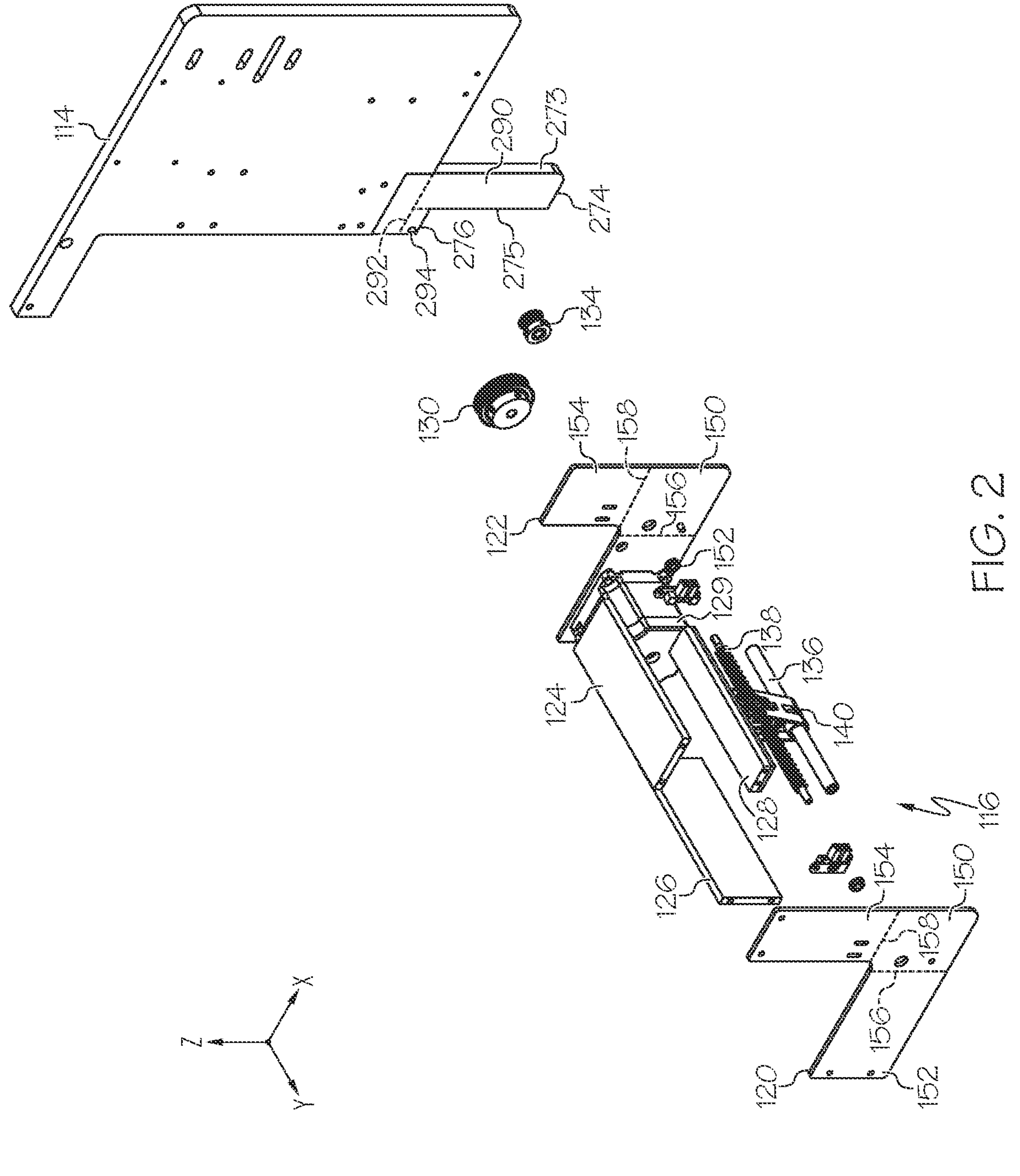
FIG. 2 includes an exploded perspective view of a cutting system in accordance with some embodiments.

FIG. 2 includes an exploded perspective view of a cutting system in accordance with some embodiments. In various embodiments, the cutting unit 116 (e.g., a crush-cutting unit, a non-crush-cutting unit) includes one or more of a first wall 120, a second wall 122, a first support 124, a second support 126, a third support 128, a first wheel 130, a belt 132 (not shown), a second wheel 134, a cutter guide 136, a screw shaft 138, a cutter assembly 140 (e.g., a crush-cutting assembly, a non-crush-cutting assembly), a first web guide 142 (not shown), a second web guide 144 (not shown), and an anvil 148.

In some embodiments, one or both of the first wall 120 and the second wall 122 extend along the X-axis and Z-axis in a plane defined by a Y-axis. One or more of the first support 124, the second support 126, the third support 128, and the anvil 148 extend along the Y-axis between the first wall 120 and the second wall 122. The first support 124, the second support 126, and/or the third support 128 may each be formed as a panel, a board, a strut, a rod, a mesh, or other structures, and may define part or all of a frame with the first wall 120 and/or the second wall 122. The first support 124 and/or the third support 128 may extend along the Y-axis and the X-axis in the plane defined by the Z-axis. The second support 126 may extend in the Y-axis and Z-axis directions and may be disposed in the plane defined by the X-axis. The second support 126, the third support 128, and/or the first support 124 may be disposed between and abutted against the first wall 120 and the second wall 122.

One or both of the first wall 120 and the second wall 122 may include a first section 150, a second section 152, a third section 154, a first border 156, and a second border 158. In various embodiments, the second section 152 may be connected to and extend along the X-axis (e.g., along a lateral direction) away from the first section 150. The first section 150 and the second section 152 may be coupled at the first border 156. The first section 150 and the third section 154 may be connected at the second border 158. The third section 154 may extend along the Z-axis away from the first section 150. In various embodiments, the second section 152 and the third section 154 may form elongated members that extend in two different directions away from the first section 150. For example, the second section 152 may extend away from the first section 150 along the X-axis direction, and the third section 154 may extend away from the first section 150 along the Y-axis direction. In various embodiments, the first wall 120 and the second wall 122 may be shaped like elbow pieces and/or L-shaped pieces. The third sections 154 may be disposed above the first sections 150, and the first section 150 may be at the same height or higher than the second sections 152.

In various embodiments, the second section 152 may extend along laterally to provide support to the cutting unit 116 and/or other components. The second section 152 may also be configured to extend below a printer 102. The second support 126 may be coupled between two corresponding second sections 152, and may be coupled between ends of the second sections 152 that are farthest from the first sections 150.

In various embodiments, one or more third sections 154 may extend along the Z-axis (e.g., in some embodiments, upwards). In various embodiments, the one or more third sections 154 may be configured to be disposed in front of a printer 102 to receive extension of a label web 106 to be received by the cutter assembly 140. For example, two third sections 154 may be disposed on either side of a label web 106 that is extended into and received by the cutter assembly 140. In some embodiments, the label web 106 may be extended next to and/or between a pair of first sections 150 and/or a pair of second sections 152.

In some embodiments, the motor 129 may be mounted to one of the second walls 122 at the second sections 152, and may extend toward the first wall 120. A drive shaft of the motor 129 may extend through the second wall 122, and the first wheel 130 may be mounted to the drive shaft on the opposite side of the second wall 122 from the motor 129. The second wheel 134 may be mounted on the same side of the second wall 122 as the first wheel 130, and the first wheel 130 and the second wheel 134 may be connected by the belt 132. The first wheel 130 and the second wheel 134 may be horizontally aligned as shown in this embodiment such that the projection of the second wheel 134 laterally along the X-axis may overlap in part or entirely with the first wheel 130. In some embodiments, the second wheel 134 and the first wheel 130 may be vertically aligned such that the projection of the second wheel 134 upward along the Z-axis may overlap in part or entirely with the first wheel 130. In various embodiments, the first wheel 130 and the second wheel 134 may have variation in vertical position and/or horizontal position. In addition, mounting the motor between the second support 126 and the third support 128 may result in a cutting unit 116 with a reduced height, facilitating use with different printers that may be incompatible with a vertically aligned form factor.

In some embodiments, the second wheel 134 is mounted to and drives rotation of the screw shaft 138. The cutter guide 136, the screw shaft 138, and the anvil 148 may be mounted to and extend between the first wall 120 and the second wall 122. The screw shaft 138 may be rotatably mounted to the first wall 120 and the second wall 122.

In some embodiments, the cutter assembly 140 may be mounted to the screw shaft 138 and the cutter guide 136. Lateral movement of the cutter assembly 140 may be driven by the screw shaft 138. In some embodiments, as part of operations, a label web 106 may be extended from the printer 102 between an anvil 148 and the cutter assembly 140. In various embodiments, as the cutter assembly 140 is driven laterally across the separated label material, a cutting blade 262 of the cutter assembly 140 is driven across the separated label material cutting entirely through the separated label material in the Z-axis direction. While cutting, the cutting blade 262 may be supported by the cutter wheel support 254, which may be fixed to or slidingly engaged with the cutting blade 262. The cutter wheel support may be fixed to or slidingly engaged with a shaft 248, which may be non-eccentric. In some embodiments, the label web 106 includes at least two layers, having a label layer on top of a liner layer. In other embodiments, the label web 106 lacks a liner layer 107 and the linerless label web 106 may be directed into the cutting unit without requiring label separation from the liner. In this way, the linerless label web 106 may cut down on waste from discarded liner layer 107 materials.

In various embodiments, the cutter guide 136 may be mounted below the screw shaft 138. The cutter assembly 140 may be mounted to the cutter guide 136 and/or the screw shaft 138 such that the cutting blade 262 is directed toward an adhesive side of a label web 106. In other words, the cutting blade 262 may be positioned to apply a cutting force towards an adhesive side that is facing the cutting blade 262. The cutting blade 262 may be caused to cut from the adhesive side through all of the label web 106. The cutting blade 262 may be positioned to cut against an anvil 148.

In some embodiments, the cutting system 100 may be modular and may include a rolling cutter 262 (e.g., one or more cutting wheels) that may be configured to cut across one or more layers of material. The material may be part of a web, such as for a continuous label that may or may not include a liner. In some embodiments, the rolling cutter 262 may cut material against a support such as an anvil 148. In various embodiments, the anvil 148 may be hardened and/or may be softer than the rolling cutter. In various embodiments, the rolling cutter may operate as a crush cutter. In some embodiments, the cutter may cut through the web from the adhesive side of the material while a side of the web without an adhesive is abutted against and/or contacting the support (e.g., the anvil 148). For example, the side of the web without an adhesive may be a printable surface and/or a protective upper surface for a tag. The side of the web without an adhesive may be a facesheet intended to be exposed once the adhesive side of the label and/or tag is adhered to a target object.

For systems using a label web 106 with a liner, the anvil 148 may be disposed (e.g., positioned) within 1, 2, 3, 4, or 5 mm of a peel edge. Other distances that are smaller or larger are also possible. The anvil's 148 cutting plane may be above the peel edge in the horizontal plane to prevent the leading edge of the label from jamming into the anvil 148. Additionally, an edge of the anvil 148 may be within 1, 2, 3, 4, or 5 mm below the tamp-pad in the Z-axis direction. This may provide improved tension in the label during cutting. Larger or smaller distances may be used in different embodiments. Although some directions have been characterized as being above or below other objects, lateral or other directions are also possible for various embodiments.

For some embodiments, cleaning brushes may be used at one or both ends of the cut system to clean the blade. This may make the system self-cleaning, and may help to remove adhesive off one or both of the cutting blade 262 and the anvil 148.

Figure 3A:
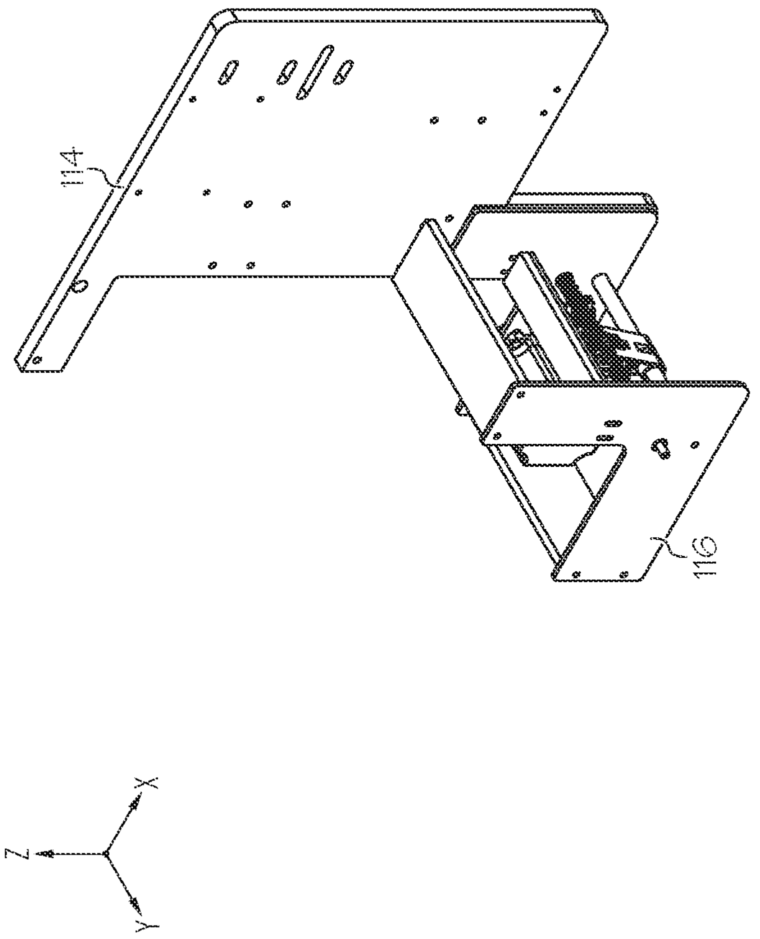
FIGS. 3A-3B include perspective views of a cutting system, in accordance with some embodiments.
Figure 3B:
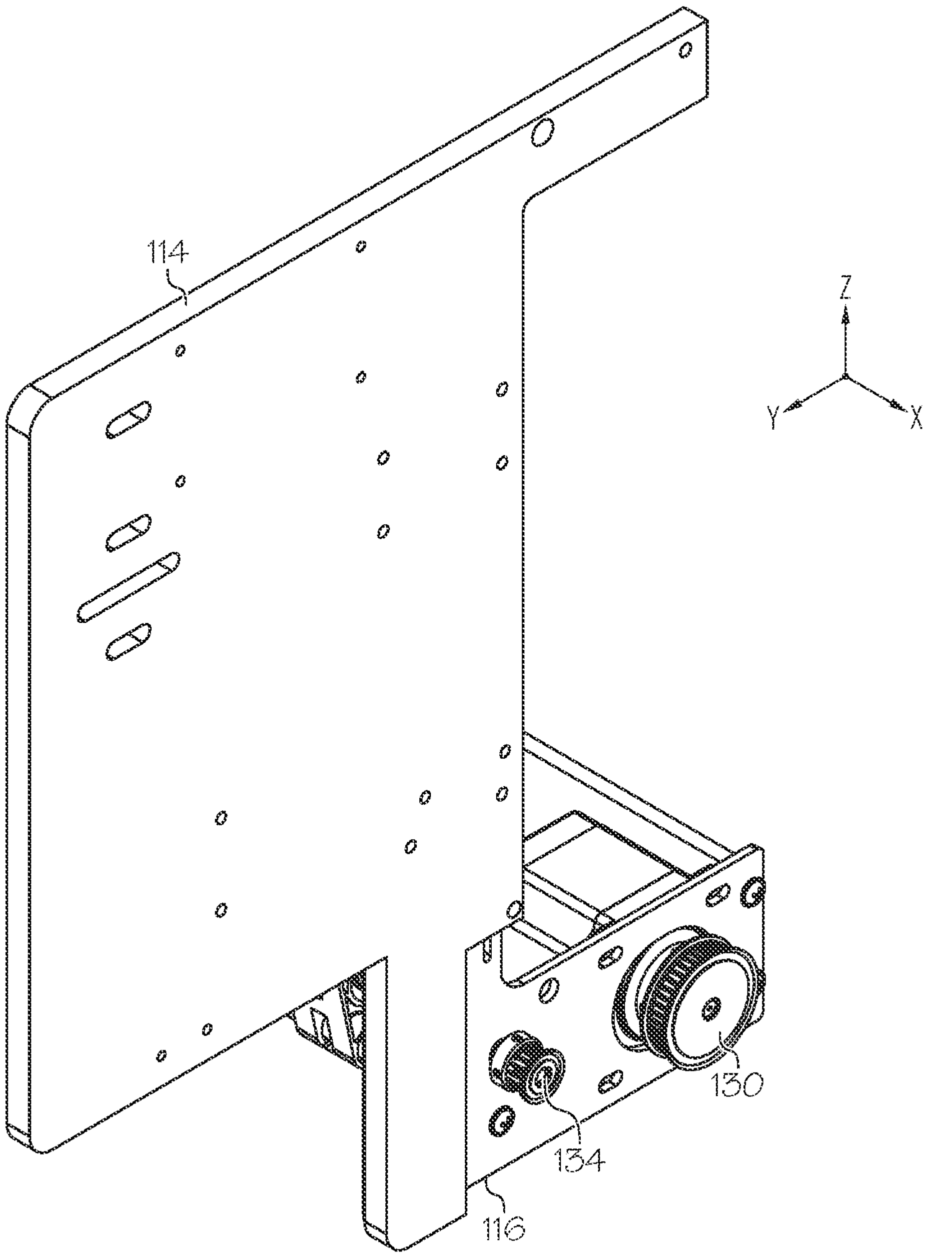

FIGS. 3A-3B include perspective views of a cutting system, in accordance with some embodiments. FIGS. 4A-4E include side, front, top, and bottom views of a cutting system, in accordance with some embodiments.

Figure 4A:
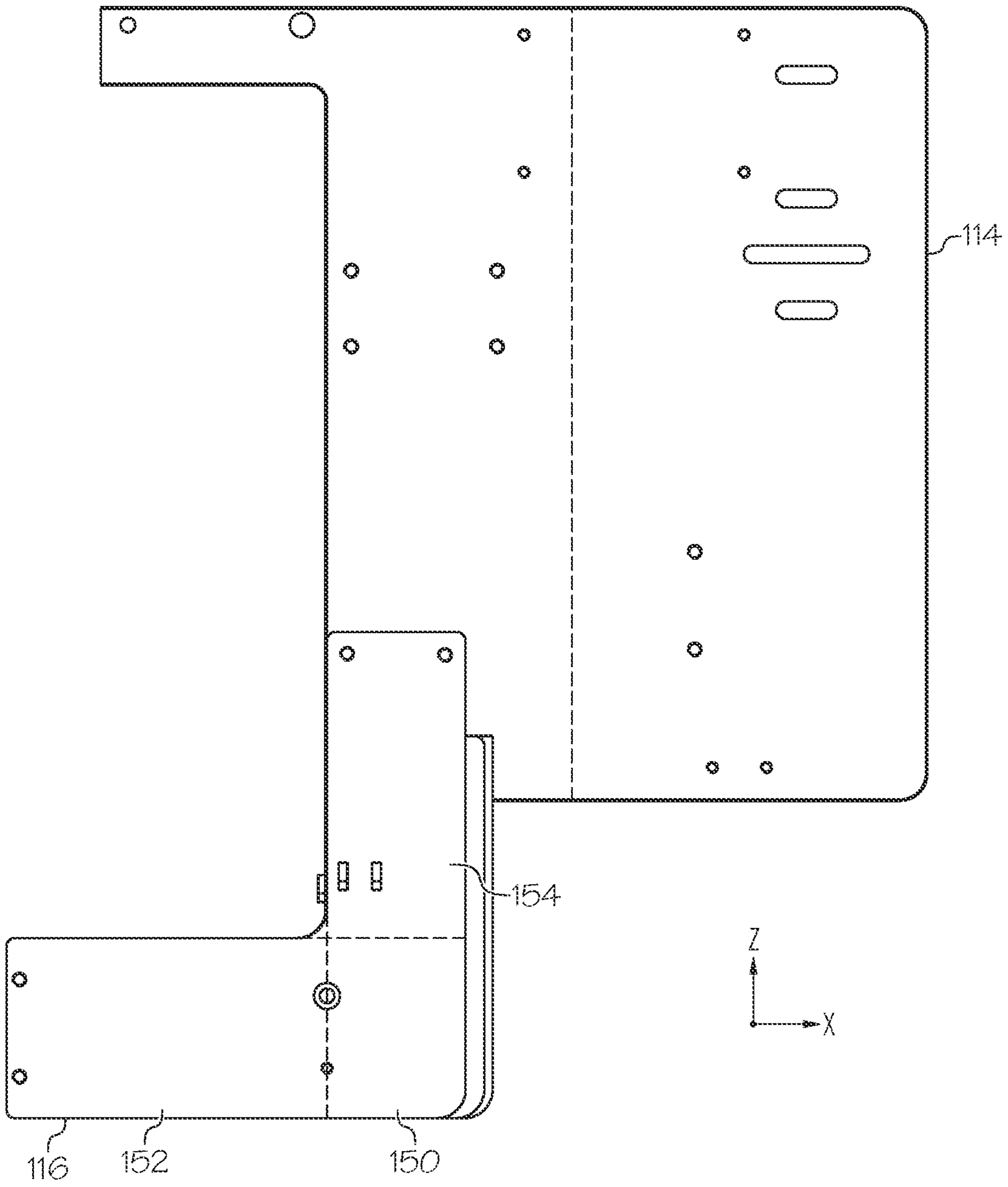
FIGS. 4A-4E include side, front, top, and bottom views of a cutting system, in accordance with some embodiments.
Figure 4B:
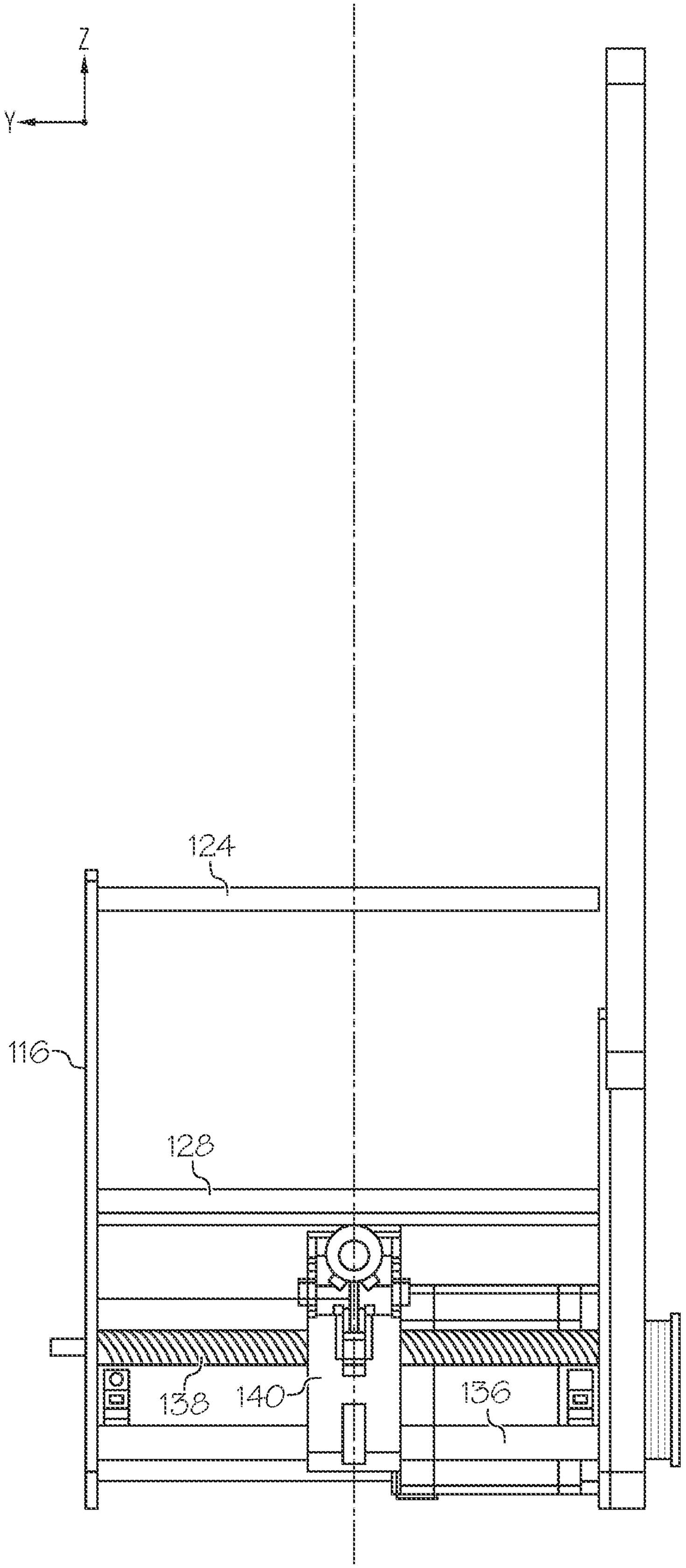
Figure 4C:
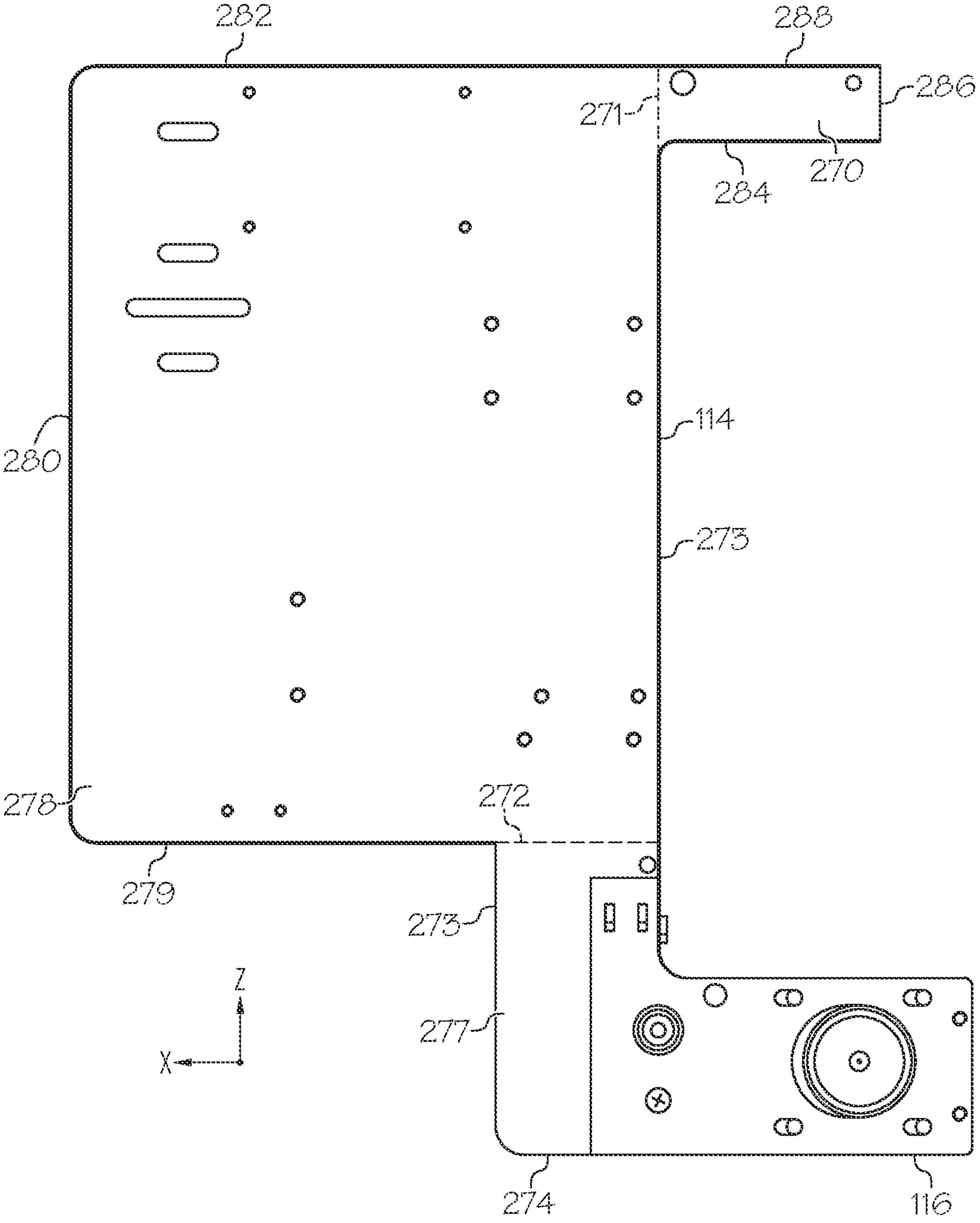
Figure 4D:
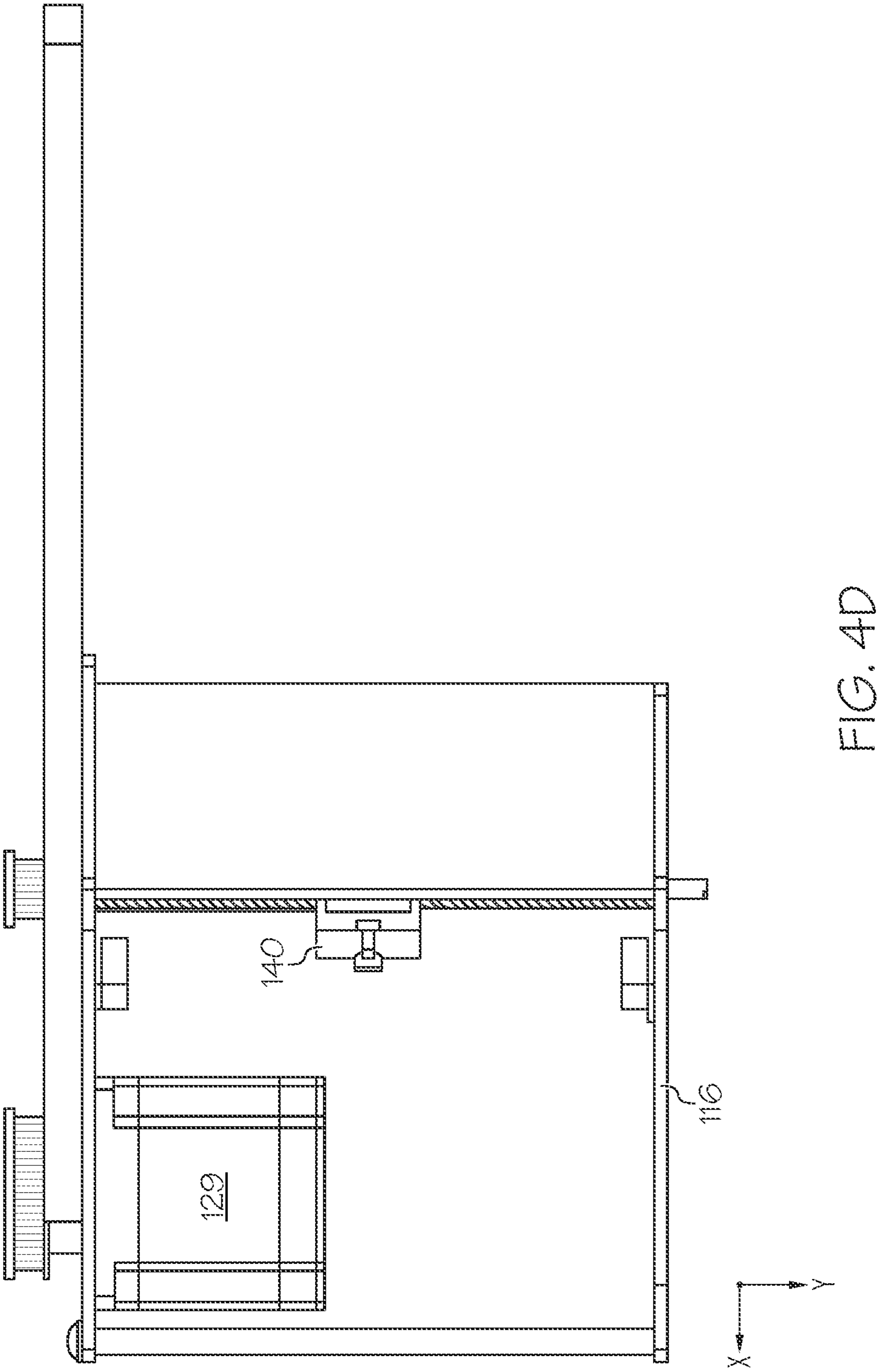
Figure 4E:
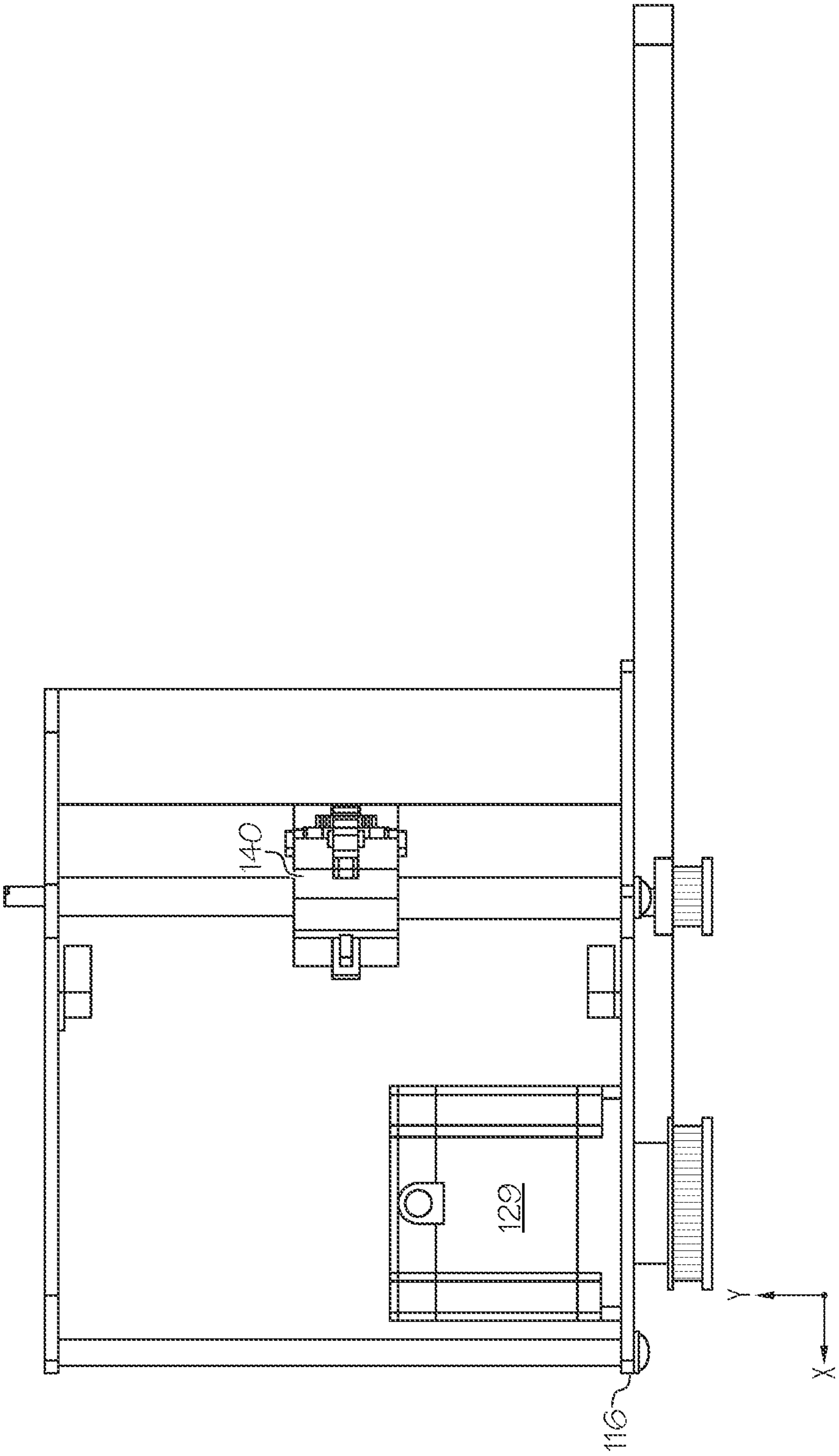

FIG. 4C is a plan view of a support bracket 114 in accordance with some embodiments. Some embodiments may include one or more of a cutter mount region 277, a tamper mount region 278, a bracket mount region 270, a first border 271, a second border 272, a first edge 273, a second edge 274, a third edge 275, a fourth edge 276, a first edge 279, a second edge 280, a third edge 282, a first edge 284, a second edge 286, a third edge 288, a first section 290, and/or a second section 292.

In some embodiments, the bracket mount region 270 may extend from a side of the cutter mount region 277, and the tamper mount region 278 may extend from a lower or bottom side of the cutter mount region 277. The bracket mount region 270 may include the first edge 284, the second edge 286, the third edge 288, and the first border 271. The first border 271 may be shared between the bracket mount region 270 and the tamper mount region 278. The bracket mount region 270 may be an elongated plate extending along an X-axis direction away from the tamper mount region 278. In some embodiments, the bracket mount region 270 may be short, wide, narrow, or have any other shape suitable for securing the support bracket 114 to a printer or other support.

In operation, the bracket mount region 270 may be secured to a printer needing additional capabilities with respect to cutting and/or tamping. Securing mechanisms may include one or more of using fasteners such as screws, bolts, or other connectors to welding. In some embodiments, the bracket mount region 270 may be integrally formed with another printer component.

In some embodiments, the cutter mount region 277 may include the second border 272, a first edge 273, a second edge 274, a third edge 275, a fourth edge 276, a fifth edge 294, a first section 290, and a second section 292. The bracket mount region 270 may extend along the Z-axis (e.g., downward) from the first edge 279 of the tamper mount region 278 at the second border 272. The tamper mount region 278 may extend along the Z-axis (e.g., upward) from the second border 272 and along the X-axis (e.g., laterally) from the first border 271.

The first section 290 and the second section 292 may both extend along the Z-axis (e.g., downward) from the second border 272. The first section 290 may be defined by the first edge 273, the second edge 274, and the third edge 275. The second section 292 may be defined by the fourth edge 276 and the fifth edge 294.

In some embodiments, the cutter mount region 277 may be configured to support a cutting unit 116 that can be adapted to add greater functionality to a printer system. For example, adding the cutting unit 116 may enable the printer to cut variable length labels from a label web 106 with a continuous label layer (e.g., with or without a liner) that has not been precut into predefined lengths. In some embodiments, the cutter mount region 277 may enable an appropriately configured cutting unit 116 to modify an existing printer, whether or not that printer already has a cutting capability, to have a variable cut length capability.

In various embodiments, the first section 150 and the third section 154 of the second wall 122 may be coupled to the first section 290 of the cutter mount region 277. The coupling may be accomplished by one or more of welding, bolting, or other connection methods. Because the second section 292 may not extend as far along the Z-axis as the first section 290, the cutter mount region 277 may define a gap that provides room for insertion of the second wheel 134.

In some embodiments, the tamper mount region 278 may be shorter as measured along the Z-axis direction than the cutter mount region 277. The tamper mount region 278 may extend laterally from the second border 272 away from the cutter mount region 277 along the X-axis direction. In some embodiments, the tamper mount region 278 may include a first edge 279, a second edge 280, and a third edge 282.

Figure 5A:
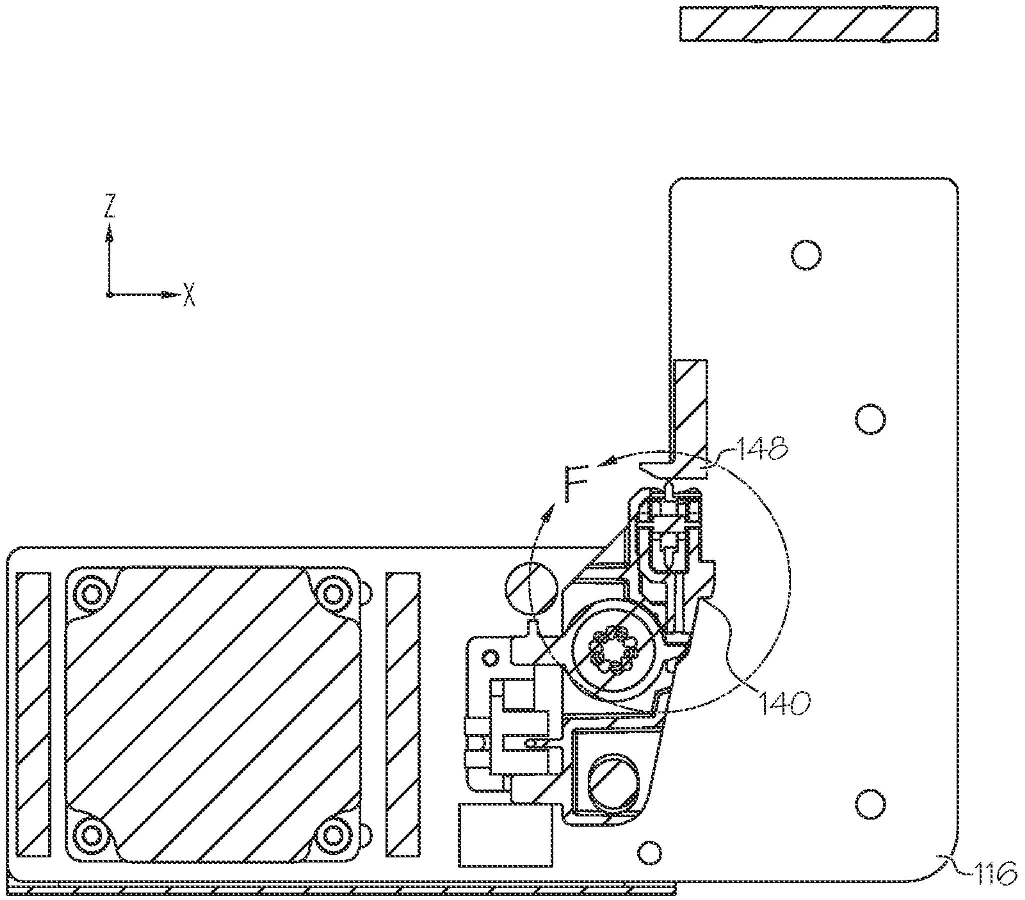
FIGS. 5A-5B include a cutaway, and an expanded cutaway view in accordance with some embodiments.
Figure 5B:
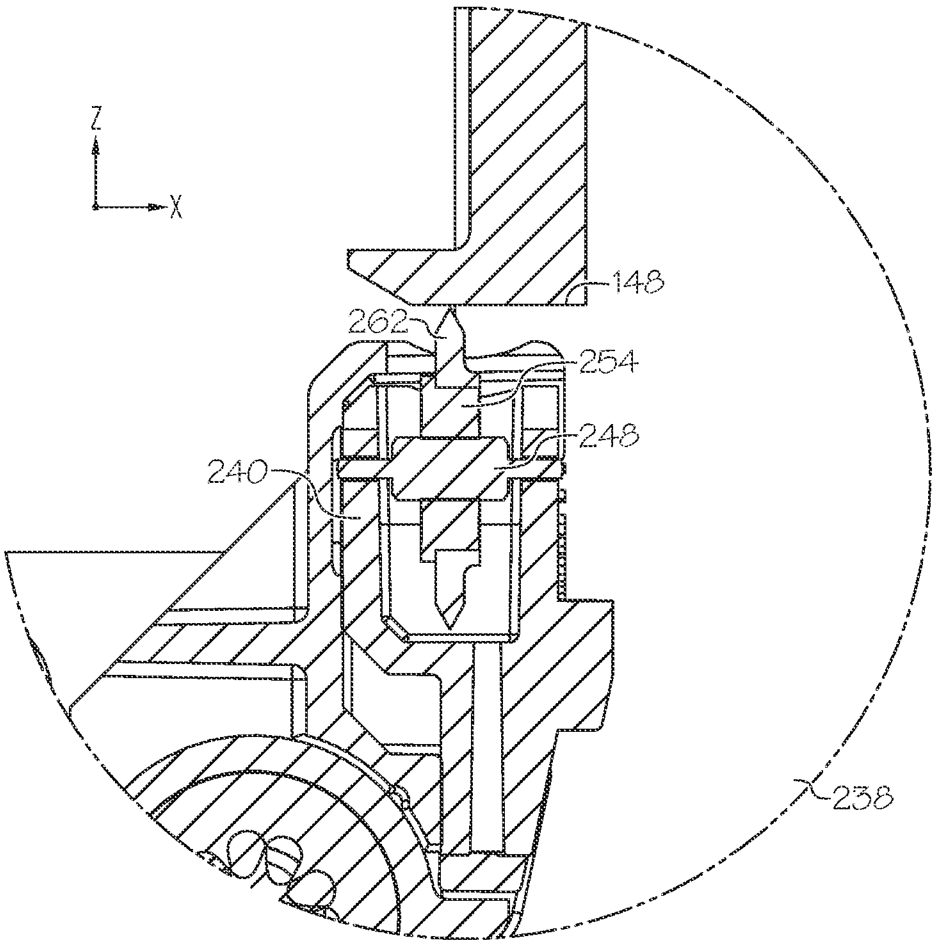
Figure 5C:
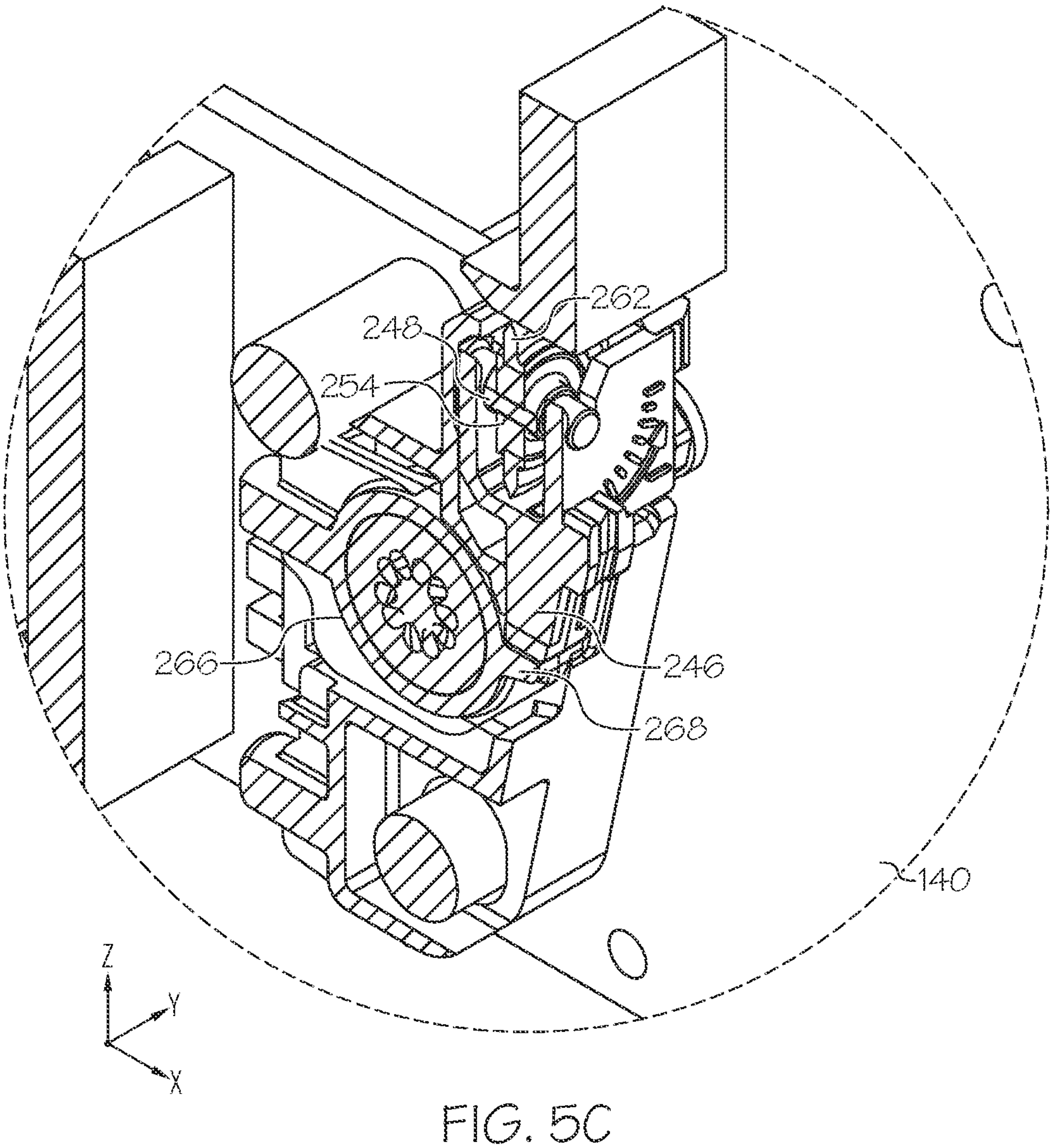
FIG. 5C includes a partially cutaway perspective view of a cutting system in accordance with some embodiments.

FIGS. 5A-5B include a cutaway and an expanded cutaway view of a cutting system in accordance with some embodiments. FIG. 5C includes an enlarged cutaway perspective view of a cutting system in accordance with some embodiments.

FIG. 5B includes an anvil 148, a cutter cartridge 238, a housing 240, a cutter wheel support 254, and a cutting blade 262.

FIG. 5C illustrates an enlarged perspective cross-sectional view of the cutter assembly 140 in accordance with some embodiments. Various embodiments may include one or more of a pressure hub 266, and a cutting blade 262.

Some embodiments may include one or more of a cartridge release tab 218, a cartridge release actuator 216, a pressure exerting portion 268, attachment points 236, a detent component 246, a cutter carrier 226, a cutter cartridge holder 234, a housing 240, a cutter cartridge 238, flanges 242, and a shaft 248.

In various embodiments, cutter assembly 140 may include one or more of a cutter carrier 226 and a removable cutter cartridge 238, each of which are described more fully below. In some embodiments, the cutting unit 116 includes a cartridge release actuator 216 comprising a cartridge release tab 218 and an actuator tab (not shown). The cartridge release actuator 216 may be positioned on the "home" side of cutting unit 116 and outboard of cutter assembly 140, which may be located on the end of screw shaft 138. In some embodiments, a cartridge release actuator 216 allows an operator to release and remove cutter cartridge 238 as an entire unit from the cutter carrier 226 of cutter assembly 140 without the need for external tools. More specifically, in some embodiments, the cartridge release tab 218 is configured such that the operator actuates or presses the cartridge release tab 218 in a backward or counter-clockwise direction which, in turn, permits the cutter cartridge 238 to engage or disengage with the cutter assembly 140. For example, rotation of the cartridge release tab 218 causes engagement of actuator tab portion (not shown) of release actuator 216 and actuator portion (not shown) of pressure hub 266 which may lift the pressure exerting portion 268, which in turn may release the detent component 246. The detent component 246, while shown as a separate part could be an integral feature of the cartridge housing 240. Once released, the cutter cartridge 238 may be removed from the cutter cartridge holder 234. A user may grasp the flanges 242 to hold or otherwise manipulate the cutter cartridge 238. In this manner, cutter assembly 140 can easily be repaired or replaced with minimal effort, risk of injury and/or downtime.

In some embodiments, cutting unit 116 may include one or more sensors 222 (e.g., an optical sensor, a magnetic sensor, an electrical sensor) and optical interrupt blades, ribs, magnets, or other actuation features appropriate for the sensing device (not shown) on the cutter carrier 226 to allow appropriate sensing for motor control at the end of a cutting process. In some embodiments, one or more sensors 222 are mounted to one or both of the first wall 120 and the second wall 122. The one or more sensors 222 may be used to set a zero position for the cutting unit 116, such as for the cutter assembly 140. In some embodiments, a second sensor can be used to set the cut stop location distal to a first sensor location. Alternatively, in some embodiments, motor rotation position feedback may be used to set a cut distance, such as based on a programmable input on the cutter's user interface.

In some embodiments, having sensors 222 (not shown) on one or both walls (e.g. may help provide cutter jam detection for each corresponding direction of cut associated with a sensor 222. In some embodiments, if a cutter assembly 140 fails to reach a sensor, a cutter processor 434 (see FIG. 7) determines that a jam has occurred. One or both sensors 222 may be adjustable in position for setting a desired cutting zone based on label location and/or width. For example, one or both sensors 222 may be adjustable by a user with or without using tools for purposes of setting a desired cutting zone, which may be based on a label position and/or width. One or both sensors 222 may be adjustable in position to minimize blade wear from direct contact between a blade and an anvil of the cutting unit when cutting beyond label width.

In some embodiments, the motor 129 may include position feedback such as from a rotary encoder mounted to the back of the motor (not shown) that can be used to sense the location of the cutter for improved jam detection, diagnostics, and/or closed loop control of the motor for improved cutter motion quality.

Figure 6:
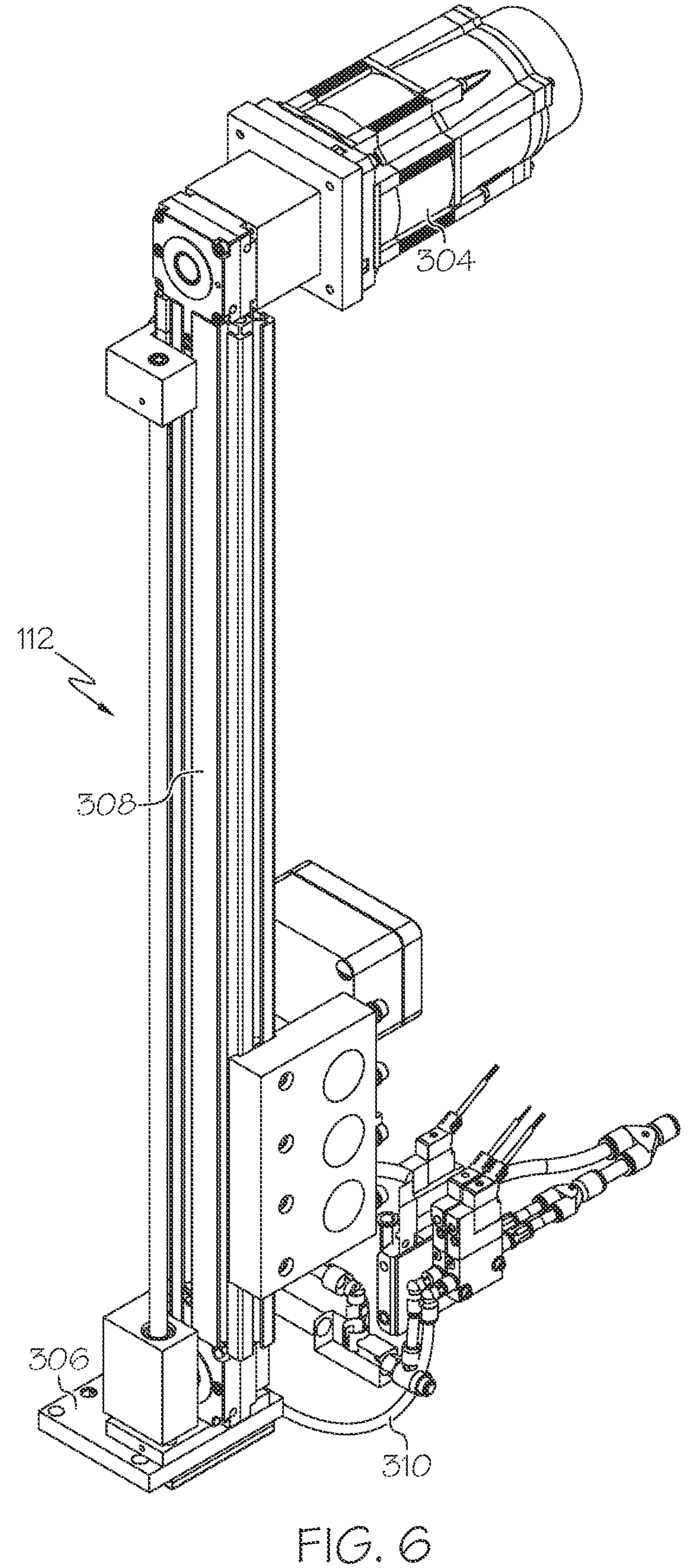
FIG. 6 is a perspective view of a tamp system in accordance with some embodiments.

FIG. 6 is a perspective view of a tamp system 112 in accordance with some embodiments. In some embodiments, the tamp system 112 includes a tamp driver 304, a tamp head 306, a beam 308, and at least one vacuum tube 310. The tamp driver 304 may be configured to drive movement of the tamp head 306 linearly. Moving the cutting system 100 in various orientations, such as along a Z axis, X axis, or Y axis direction may help with applying labels to the top, side, or an underside of an object such as a box or package. In some embodiments, the tamp driver 304 is an electric motor or an air cylinder. In various embodiments, at least one vacuum tube 310 may draw air into one or more holes disposed in the lowest side of the tamp head, creating a suction sufficient to hold a label against the tamp head until an adhesive side is adhered to a target object. The beam 308 may telescope to allow extension of the tamp head 306 to deliver a label to a target object, such as a package.

Figure 7:
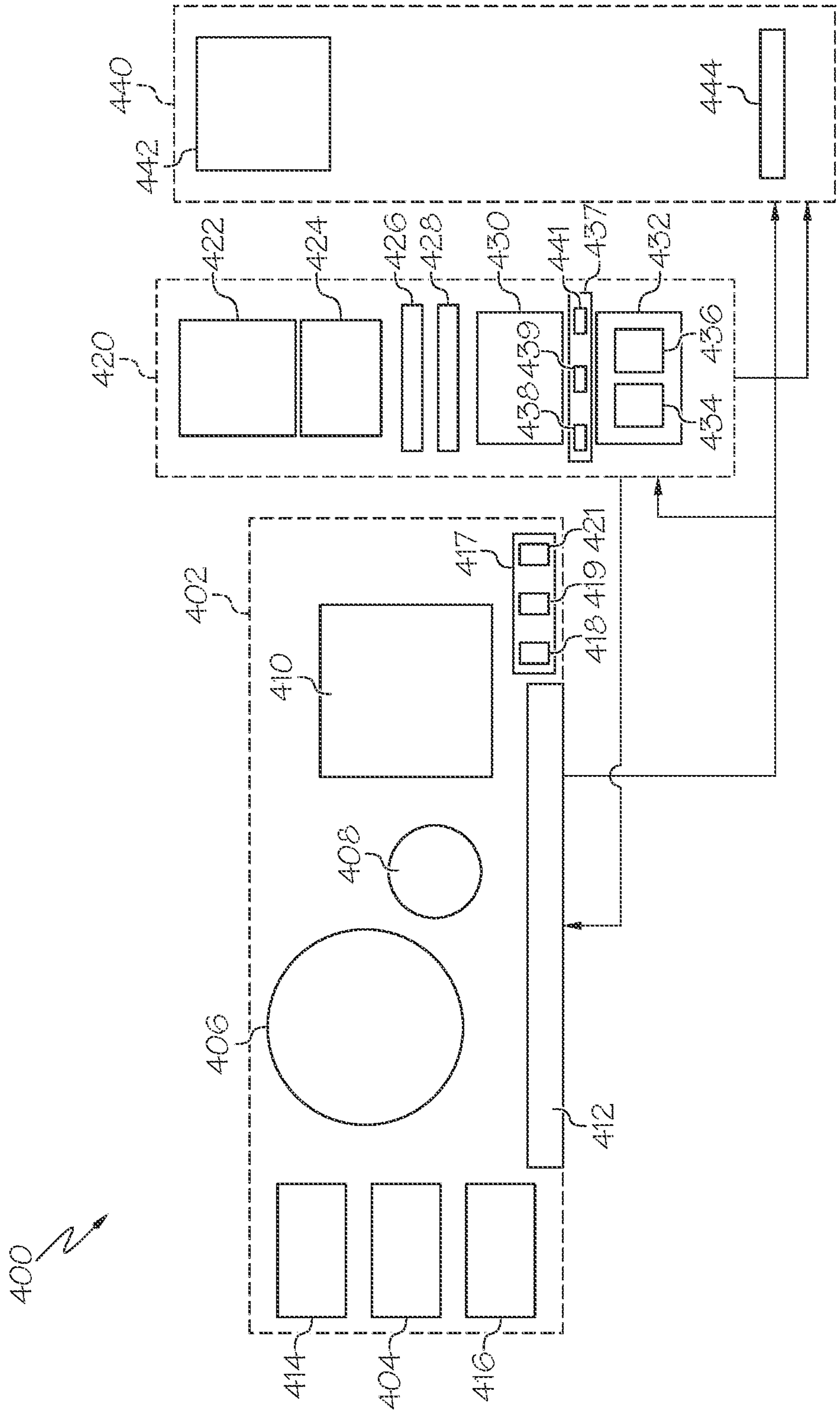
FIG. 7 is a block diagram of a printing system in accordance with some embodiments.

FIG. 7 is a block diagram of a printing system 400 in accordance with some embodiments. In various embodiments the printing system 400 may include one or more of a print and apply machine 402, a cutter system 420, and/or the label applicator 440. In various embodiments, the print and apply machine 402 may be the same or different from the printer system 101. In various embodiments, the cutter system 420 may be the same or different from the cutting unit 116. In various embodiments, the label applicator 440 may be the same or different from the tamp system 112.

In some embodiments, the print and apply machine 402 may include one or more of a power supply 404, a supply roll 406, a liner takeup 408, a printer 410, an applicator interface 412, a printer processor 414, a printer memory 416, a printer user interface 417, a printer display 418, printer keys 419, and/or at least one printer indicator light 421. In some embodiments, the cutter system 420 may include one or more of a cutter mechanism 422, a cutter motor 424, a left home sensor 426, a right home sensor 428, a power supply 430, a cutter control board 432, a cutter processor 434, cutter memory 436, a cutter user interface 437, a cutter display 438, cutter keys 439, and/or at least one cutter indicator light 441. In some embodiments, the label applicator 440 may include one or more of a tamp mechanism 442 and/or an airstream control 444.

In some embodiments, the printer user interface 417 may provide information about the print and apply machine 402 to a user, such as regarding programmable inputs and machine status reporting. In some embodiments, the printer display 418 may be used to provide text and/or images, and the printer keys 419 may be physical keys or touch screen buttons. In some embodiments, the printer indicator light 421 may be used to provide information regarding the status of the print and apply machine 402.

In some embodiments, the cutter user interface 437 may provide information about the cutter system 420 to a user, such as regarding programmable inputs and machine status reporting. In some embodiments, the cutter display 438 may be used to provide text and/or images, and the cutter keys 439 may be physical keys or touch screen buttons. In some embodiments, the cutter indicator light 441 may be used to provide information regarding status of the cutter system 420.

In some embodiments, the power supply 404 provides power to the print and apply machine 402. The supply roll 406 provides a label web 106 that is received by the printer 410. The liner 107 for the label web 106 may be drawn back onto the liner takeup 408. The cutter system 420 may then receive the label web 106. The printer processor 414 and the printer memory 416 may be configured through software instructions to control operations of the print and apply machine 402 and to communicate with other devices and systems.

In some embodiments, the cutter mechanism 422 is moved laterally by the cutter motor 424. In some embodiments, the left home sensor 426 and the right home sensor 428 provide signals when the cutter mechanism 422 reaches a left home or a right home position, respectively. In various embodiments, the power supply 404 and/or the power supply 430 provides power to the cutter system 420. The cutter control board 432 includes at least one cutter processor 434 and at least one cutter memory 436 which contain software instructions that control operation of the cutter system 420 and/or communication with other systems.

In some embodiments, the cutter system 420 and the label applicator 440 receive the same signals from the print and apply machine 402, and the cutter system 420 adapts its cutting operations based on the instructions provided to the tamp mechanism 442, such as for control of an airstream and/or triggering a tamping sequence. In some embodiments, for some modular add-on systems for printers lacking a cutting system, this or other outputs from the print and apply system 402 may be used to control one or more functions of the cutter system 420. The label applicator 440 may receive the same control signals from the print and apply system 402.

In some embodiments, the cutter processor 434 detects the termination of an airstream signal 448 from the printer processor 414 to the tamp mechanism 442. In some embodiments, the airstream signal 448 is used to turn on an air assist valve that directs air towards an extended label that is cantilevered out from a support such that the extended label end is pushed towards the tamp head (e.g., the tamp head 306). The tamp head may have a vacuum assist that draws the label and/or label end towards the tamp head. In various embodiments, the tamp head vacuum and the air assist are both used at the same time, and may be started and/or stopped at the same time.

Based on the termination of the airstream signal 448, the cutter processor 434 may cause the cutter motor 424 to drive the cutter mechanism 422 until one of the left home sensor 426 and the right home sensor 428 detects that the cutter mechanism 422 has reached a left or right end point, at which point the cutter processor 434 may cause the cutter motor 424 to stop. The label web 106 may be liner-free, meaning there is no liner web 107 to be separated from the label web 106.

The tamp driver 304 may then drive movement of the tamp head 306, extending it down and toward a target object (e.g. a package). The tamp head 306 may be used to press a label down against the target object, where the adhesion layer may become adhered to the target object, bonding the label to the target object. In some embodiments, the tamp head 306 may be driven to come in close proximity to the target object and a momentary blast of air through the holes in the tamp head 306 cause the label to be released from the tamp head 306 and adhered to the target object. The tamp driver 304 may then retract the tamp head 306 to a retracted position where it may be positioned to accept another label once cut.

The print and apply machine 402 can then retract the label web 106 back into the print and apply machine 402 to get it ready for printing a subsequent label without wasting label material.

Figure 8:
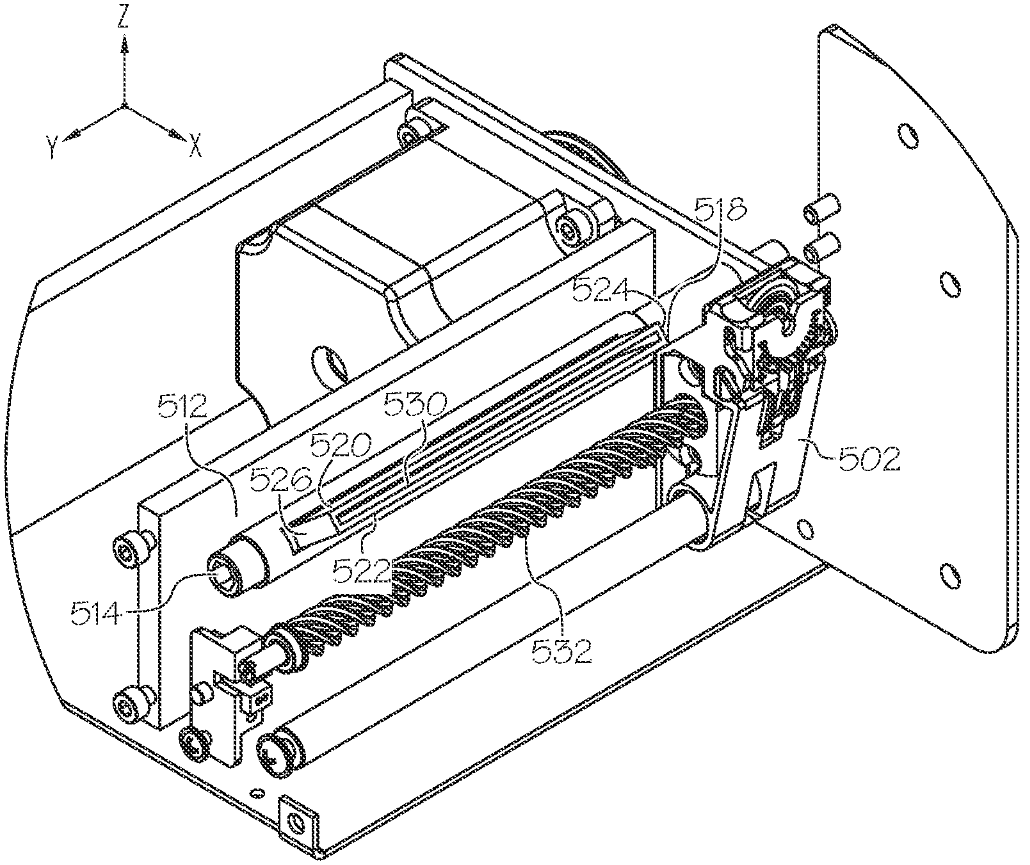
FIG. 8 is an enlarged perspective view of a cutting system having an air directing system in accordance with some embodiments.
Figure 9:
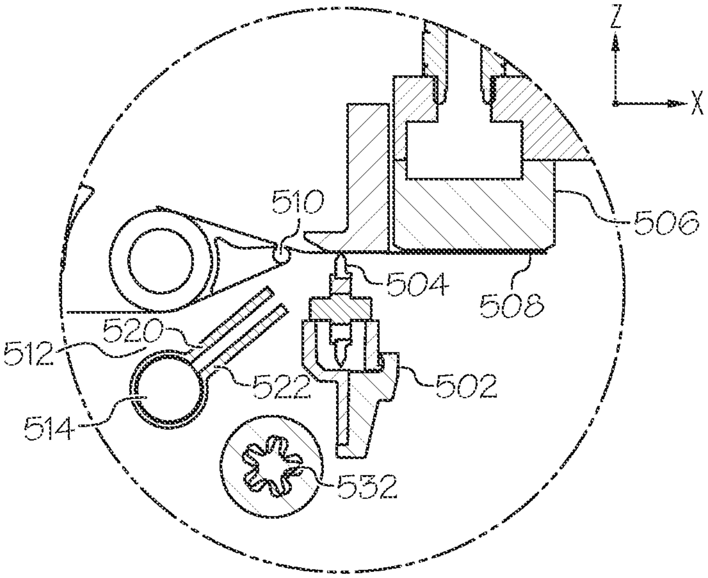
FIGS. 9 and 10 are each an enlarged cutaway view of a cutting system having an air directing system in accordance with some embodiments.
Figure 10:
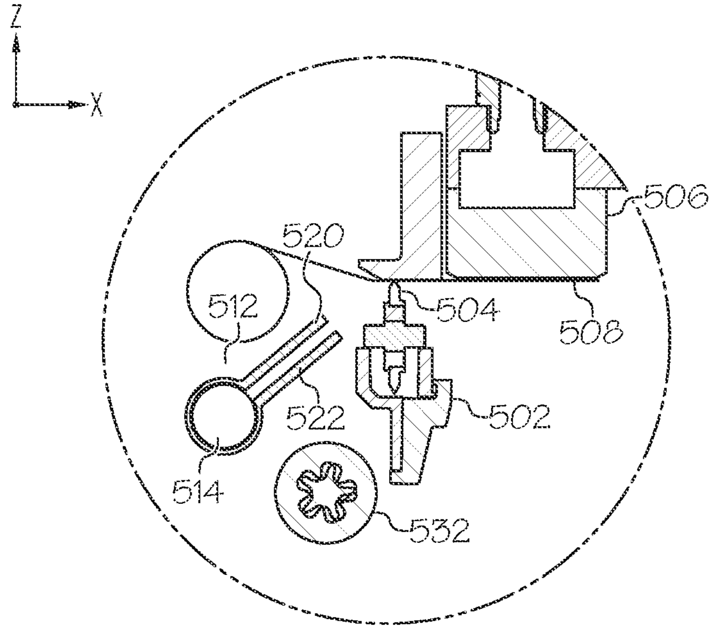
Figure 11:
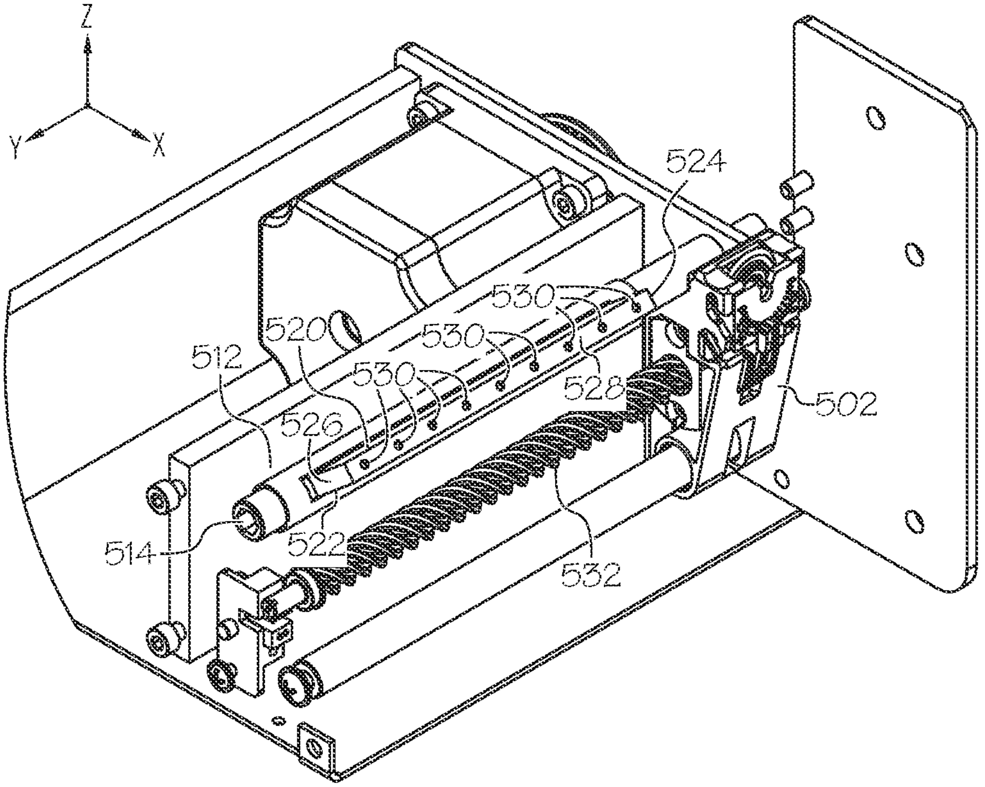
FIGS. 11 and 12 are each enlarged perspective views of a cutting system having an air directing system in accordance with some embodiments.
Figure 12:
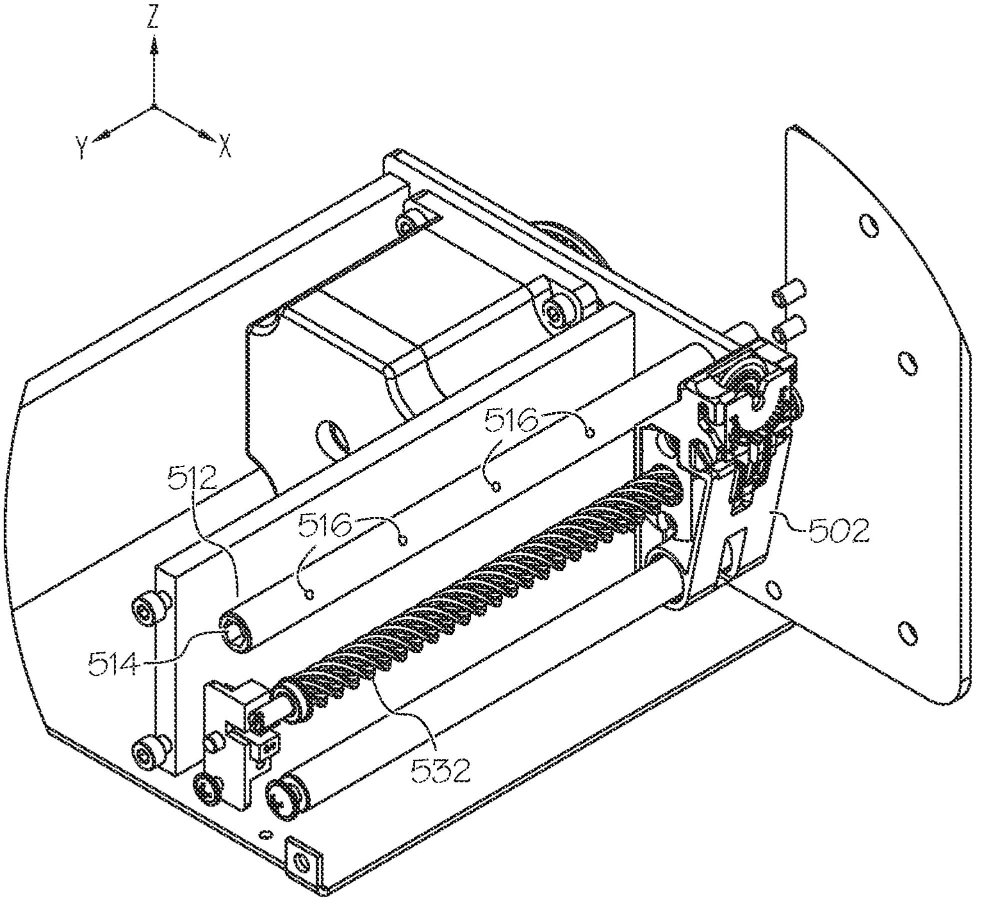

FIGS. 8, 9, 10, 11, and 12 illustrate various embodiments of cutting systems having various types of air directing systems (e.g., air assist systems 512). FIG. 8 is an enlarged perspective view of a cutting system having an air directing system in accordance with some embodiments. FIGS. 9 and 10 are each an enlarged cutaway view of a cutting system having an air directing system in accordance with some embodiments. FIGS. 11 and 12 are each enlarged perspective views of a cutting system having an air directing system in accordance with some embodiments.

In some embodiments and as shown in one or more of FIGS. 8-12, a cutting system may include one or more of a cutter assembly 502, a cutting blade 504, a tamp system 506, a tamp pad 508, a peel bar 510, an air assist system 512, an air assist pipe 514, one or more first air assist ports 516, an air assist duct 518, a first air assist wall 520, a second air assist wall 522, a third air assist wall 524, a fourth air assist wall 526, a fifth air assist wall 528, one or more second air assist ports 530, and a screw shaft 532.

In some embodiments, the air assist system 512 may be designed to direct air flow towards the underside of a web of label material that is being advanced. The web material may be advanced towards and/or over a cutter assembly 502 and towards a tamp system 506. In various embodiments, the use of the air assist system 512 may help to prevent web of label material from sagging down as the cutter assembly 502 cuts the web. The air assist system 512 may also prevent the web of label material from tripping over, getting misaligned, folded, bent, scratched, nicked, or otherwise damaged by contacting the cutting blade 504 and/or other parts of the cutter assembly 502 while the web is being advanced toward the tamp system 506.

In some embodiments, the air assist system 512 includes an air assist pipe 514, such as in FIG. 12. The air assist pipe 514 may include one or more first air assist ports 516. One or more of the first air assist ports 516 may include a hole drilled, cast, or otherwise formed in an outer wall of the air assist pipe 514. The one or more first air assist ports 516 may be one or more of round, rounded, square, elliptical, or any other shape. In some embodiments, the one or more first air assist ports 516 may extend continuously or intermittently along the length of the air assist pipe 514 along a distance that corresponds to the width of the web of material. The air assist pipe 514 may be a hollow tube, hose, or other object having a channel configured to deliver a flow of air or other gas. The one or more first air assist ports 516 may be directed upwards (e.g., in the Z-axis direction) and/or laterally (e.g., in the X-axis direction).

In some embodiments, the air assist system 512 may include one or more first air assist ducts 518. The one or more first air assist ducts 518 may be configured to extend from a side of the air assist pipe 514 towards the underside of the web. For example, the one or more first air assist ducts 518 may extend upward (e.g., along the Z-axis) and/or laterally (e.g., along the X-axis). The one or more first air assist ducts 518 may extend along the air assist pipe 514, either continuously or with spaces in between. A single first air assist duct 518 may extend continuously along the length of the air assist pipe 514.

The one or more first air assist ducts 518 may be rounded, square, straight, or curved, and may be formed with one or more sides. Each of the first air assist ducts 518 may be formed to carry air or other gas through a channel towards the underside of the web and/or towards the blade 504. In some embodiments, the one or more first air assist ducts 518 may include a first air assist wall 520 and a second air assist wall 522 that are disposed on opposite sides of and that define a channel for air flow. In some embodiments, the one or more first air assist ducts 518 may include a third air assist wall 524 and a fourth air assist wall 526 that extend between the first air assist wall 520 and the second air assist wall 522 and that further define the channel through the one or more first air assist ducts 518.

In some embodiments, the one or more first air assist ducts 518 include a fifth air assist wall 528 formed at the distal end of the one or more first air assist ducts 518 relative to the air assist pipe 514. The fifth air assist wall 528 may be attached to one or more of the first air assist wall 520, the second air assist wall 522, the third air assist wall 524, and the fourth air assist wall 526. The fifth air assist wall 528 may define a second air assist port 530 that is a passage through the fifth air assist wall 528, that connects with the channel within the air assist duct 518, and that permits fluid communication between the channel within the air assist pipe 514, the channel within the air assist duct 518, the second air assist port 530, and the air or other gas outside the second air assist port 530.

In some embodiments, the air assist pipe 514 may be higher or lower than the screw shaft 532, and may be disposed laterally along the X-axis to either side or directly above the screw shaft 532. In some embodiments, the one or more air assist ducts may have one or more distal ends that are higher or lower than a midpoint of the cutting blade 504, which may be circular and/or have a central hub about which it may rotate.

In various embodiments, a thickness of the air assist duct 518 measured between the outside surfaces of the first air assist wall 520 and the second air assist wall 522 may be thinner than an outside diameter of the air assist pipe 514. This may permit the air assist duct 518 to reach into areas near the web that may be more difficult to reach with the air assist pipe 514. The air assist duct 518 may also be formed to accelerate air movement by having a narrower channel than the air assist pipe 514.

In some embodiments, the illustrations of FIGS. 1-12 are proportional and to scale. In other embodiments, any of the features may have larger or smaller dimensions, with alternate rotations or translated positions.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A modular cutting system comprising:

a crush-cutting unit configured to receive a label web from a printer and to cut through an adhesive layer of the label web towards an outer surface of the label web; and an anvil positioned to hold the label web in place when the label web is disposed between the anvil and the crush-cutting unit, wherein the anvil is positioned above the crush-cutting unit.

2. The system of claim 1, further comprising a support bracket configured for being mounted to a label printer.

3. The system of claim 2, wherein the crush-cutting unit is mounted to the support bracket.

4. The system of claim 1, further comprising a tamp system.

5. The system of claim 4, wherein the tamp system is configured for being mounted to the support bracket.

6. The system of claim 1, further comprising a printer configured for printing at least one of an image and text on the label web.

7. The system of claim 1, wherein the crush-cutting unit further comprises a rotatable cutting wheel.

8. The system of claim 1, wherein the crush-cutting unit further comprises a blade that is removable without external tools.

9. The system of claim 1, wherein the crush-cutting unit is configured for receiving a label web after it has been separated from its liner.

10. The system of claim 1, wherein the crush-cutting unit is configured for receiving a linerless label web.

11. The system of claim 1, wherein the crush-cutting unit comprises a first wall and a second wall, each having a first section, a second section attached to the first section and extending laterally, and a third section attached to the first section and extending vertically.

12. The system of claim 11, wherein the crush-cutting unit further comprises a motor mounted to at least one of the second sections.

13. The system of claim 1, further comprising an air assist pipe formed with one or more first air assist ports.

14. The system of claim 13, further comprising an air assist duct that extends from the air assist pipe.

15. A method, comprising:

using a crush-cutting unit, receiving a label web from a printer, the label web having an adhesive side and an opposite side;

using a blade of the crush-cutting unit, crush-cutting through the label web from the adhesive side towards the opposite side, wherein the crush-cutting unit further comprises an anvil positioned to hold the label web in place when the label web is disposed between the anvil and the crush-cutting unit, wherein the anvil is positioned above the crush cutting unit.

16. The method of claim 15, wherein the crush-cutting unit further comprises a support bracket configured for being mounted to a label printer.

17. The method of claim 16, wherein the crush-cutting unit is mounted to the support bracket.

18. The method of claim 15, wherein the crush-cutting unit further comprises a tamp system.

19. The method of claim 18, wherein the tamp system is configured for being mounted to the support bracket.

20. The method of claim 15, wherein the printer is configured for printing at least one of an image and text on the label web.

21. The method of claim 15, wherein the crush-cutting unit further comprises a 25. rotatable cutting wheel.

22. The method of claim 15, wherein the crush-cutting unit further comprises a blade that is removable without external tools.

23. The method of claim 15, wherein the crush-cutting unit is configured for receiving a label web after its liner has been separated from the label web.

24. The method of claim 15, wherein the crush-cutting unit is configured for receiving a linerless label web.

25. The method of claim 15, wherein the crush-cutting unit comprises a first wall and a second wall, each having a first section, a second section attached to the first section and extending laterally, and a third section attached to the first section and extending vertically.

26. The method of claim 25, wherein the crush-cutting unit further comprises a motor mounted to at least one of the second sections.

27. The method of claim 15, wherein the crush-cutting unit further comprises an air assist pipe formed with one or more first air assist ports.

28. The method of claim 27, wherein the crush-cutting unit further comprises an air assist duct that extends from the air assist pipe.

* * * * *